United States Patent

Bovenkerk et al.

[15] 3,645,706

[45] Feb. 29, 1972

[54] RESINOID GRINDING WHEELS CONTAINING NICKEL-COATED CUBIC BORON NITRIDE PARTICLES

[72] Inventors: Harold Paul Bovenkerk, Worthington; William Arthur Berecki, Columbus, both of Ohio

[73] Assignee: General Electric Company

[22] Filed: Dec. 16, 1969

[21] Appl. No.: 885,630

[52] U.S. Cl. ................................. 51/295, 51/298, 51/309
[51] Int. Cl. ................................................ B24d 17/00
[58] Field of Search ............................ 51/295, 298, 309

[56] References Cited

UNITED STATES PATENTS

| | | | |
|---|---|---|---|
| 3,351,543 | 11/1967 | Vanderslice | 51/309 |
| 3,408,172 | 10/1968 | Wright et al. | 51/298 |
| 3,518,068 | 6/1970 | Gillis | 51/298 |
| 3,528,788 | 9/1970 | Seal | 51/295 |

*Primary Examiner*—Donald J. Arnold
*Attorney*—Allard A. Braddock, Harold J. Holt, Frank L. Neuhauser, Oscar B. Waddell and Joseph B. Forman

[57] ABSTRACT

An improved resinoid grinding wheel particularly useful for the wet or dry grinding of hardened steels and steel alloys utilizes nickel-coated cubic boron nitride particles as the abrasive medium.

6 Claims, No Drawings

RESINOID GRINDING WHEELS CONTAINING NICKEL-COATED CUBIC BORON NITRIDE PARTICLES

BACKGROUND OF THE INVENTION

Boron nitride is a compound which comes in a "soft" form and in two "hard" forms. In the "soft" form it is a material which crystallizes in the hexagonal system and cleaves readily in a manner similar to graphite and molybdenum disulfide. Like these materials it is a good dry lubricant.

If boron nitride is subjected to ultrahigh pressures and elevated temperatures, it is converted to a cubic crystal similar to the crystal of zincblende to produce one of its "hard" forms. The preparation of this form of boron nitride is disclosed and claimed in Wentorf U.S. Pat. No. 2,947,617 which is assigned to the same assignee as the present invention.

If "soft" boron nitride is subjected to pressures of at least about 113 kilobars preferably at a temperature somewhat higher than room temperature, it is converted to a densely packed form of "hard" boron nitride possessing the same hexagonal crystal structure as the mineral wurtzite. This form of "hard" boron nitride is disclosed and claimed in Bundy et al. U.S. Pat. No. 3,212,851 which also is assigned to the same assignee as the present invention.

The zincblende form of boron nitride was discovered some years before the wurtzite form. Both the zincblende and wurtzite forms are useful in the practice of this invention and it is intended that the wurtzite form be included in the term "cubic boron nitride."

The discovery of cubic boron nitride occurred several years after the discovery of a reproducible synthesis for diamond. Initially it was thought that cubic boron nitride was as hard as diamond but additional investigations revealed that cubic boron nitride is a close second to diamond in hardness. Both are considerably harder than other abrasive materials.

Synthetic diamond became commercially available as an abrasive in 1957. It was early established that the abrasive qualities of synthetic diamond were superior to those of natural diamond. The disparity in favor of synthetic has steadily increased as processes for tailoring the product to specific applications have been developed.

From the inception of its commercialization, synthetic diamond has been a growing industry. Its use in a resin-bonded wheel for grinding tungsten carbides has brought about great economies in the finishing of carbide tools. Its use in a metal bond has resulted in saws which bring about great improvement in the cutting of natural stones and ceramics.

When cubic boron nitride was first discovered, it was thought that it would have widespread usage due to its hardness and other properties. For instance, cubic boron nitride can withstand temperatures of 2,500° F. whereas diamond begins to burn at 1,600° F. Nevertheless, cubic boron nitride proved to be inferior to diamond as an abrasive for tungsten carbides, ceramics, and natural stones. It offered advantages over diamond in the cutting of hardened steels and steel alloys but neither diamond nor cubic boron nitride was competitive with such abrasives as aluminum oxide for hardened steels and steel alloys. Thus, although cubic boron nitride is 2½ times as hard as aluminum oxide, its cost per gram would inherently be about the same as the cost per kilogram of aluminum oxide. Even though other cost factors such as labor, wheel dressing, etc., favored cubic boron nitride, the disparity in material cost was too great for cubic boron nitride to compete in the aluminum oxide market.

In 1967, metal-coated diamond was introduced to the market for use in resinoid grinding wheels. Typically, the use of metal-coated diamond extended the effectiveness of grinding wheels by a factor of two. Such wheels are described in Lindstrom and Lundblad South African Pat. No. 66/5310 advertised on Mar. 8, 1967 and assigned to Allmanna Svenska Elektriska Aktiebolaget. Another document describing metal-coated diamond resinoid wheels is Sacco South African Pat. No. 67/2576 of the Norton Company.

The Sacco patent pointed out that it had been known to coat aluminum oxide abrasive grains with nickel to achieve improved bonding of abrasive particles in a resinoid wheel. In addition, the patent postulated that the greater heat conductivity of heat capacity of diamond coated with metal prevented rapid deterioration of the resin matrix in the vicinity of the abrasive grit thereby allowing for longer retention of the abrasive grit in the resin matrix.

The Sacco patent gave examples of five resinoid wheels using diamond abrasives coated with various metals. The improvement in grinding ratio versus wheels made with uncoated diamond varied from 37 percent to 280 percent. Thus, the most-improved wheels removed 3.8 times as much material from workpieces as did wheels made with uncoated diamond from similar workpieces. These levels of improvement are typical of what has been achieved by metal-coated diamond.

SUMMARY OF THE INVENTION

In accordance with the present invention it has been discovered that a resinoid grinding wheel employing abrasive particles of cubic boron nitride coated with nickel to the extent of 30 to 80 weight percent of the coated particles is much more effective than a similar wheel in which the particles are uncoated.

DESCRIPTION OF THE PREFERRED EMBODIMENT

The resinoid grinding wheel of the present invention is characterized by the use of nickel-coated cubic boron nitride particles as the abrasive medium. The use of such abrasive particles does not necessitate other alterations in wheel structure and so the resinoid wheel may otherwise be of conventional construction. This statement is not intended to mean that nickel-coated cubic boron nitride wheels do not give improved performance with certain resins or with particular methods of fabrication.

In a typical preparation of a resin-bonded nickel-coated cubic boron nitride grinding wheel, a mixture of granulated resin, nickel-coated cubic boron nitride particles and filler is placed in a grinding wheel mold, a molding pressure appropriate to the particular resin—usually of the order of several thousand pounds per square inch—is applied and the mold is heated to a temperature sufficient to make the resin granules deform plastically and to cure in cases where the resin used is heat-curable.

The resin most frequently used in resin-bonded grinding wheels is a phenol-formaldehyde reaction product. However, other resins or organic polymers may be used such as melamine or urea-formaldehyde resins, epoxy resins, polyesters, polyamides, and polyimides. Polyimides in particular have shown promising results. Typically, the abrasive surface of nickel-coated cubic boron nitride grinding wheels will contain about 25 percent by volume of abrasive.

There is no novel technology involved in applying a nickel coating to the cubic boron nitride particles nor is the size of the particles critical to the success of the invention. It is desirable that the entire surface of particles be coated and that the weight of the coating be 30 to 80 percent of the combined weight of the particle and coating. Generally, the particle size will range from 60 mesh to 325 mesh but larger or smaller particles may be used to advantage depending upon service requirements.

Typical processes for applying a nickel coating to cubic boron nitride particles are by electroless deposition, well known in the art, but sputtering as disclosed and claimed in Vanderslice U.S. Pat. No. 3,351,543, which is assigned to the same assignee as the present invention, or by high vacuum deposition from a filament composed of nickel. In the latter case, it is necessary to agitate the cubic boron nitride particles in order to insure a nickel coating on all surfaces. After a thin film of nickel has been applied by one process, the film may be built up by another process such as conventional electrolytic deposition from an electrolyte solution. It is not necessary that the nickel have an extremely tenacious bond with the cubic baron nitride substrate.

The following is a typical procedure for formulating a resin-bonded cubic boron nitride grinding wheel:

1. Weight out the material as follows: 40 volume percent nickel-coated cubic boron nitride using density of 5.29 g./cc.; 39 volume percent phenolic resin using a density of 1.28 g./cc. (The phenolic resin powder is preferably less than 100 mesh). 21 volume percent filler composed of silicon carbide approximately 20 microns in size using 3.22 g./cc. as the density.
2. Premix or blend in a mortar and pestle the resin and filler until homogeneous. Mix cubic boron nitride with 1 percent of a wetting agent which is typically furfural. Combine cubic boron nitride, furfural and resin filler mixture and lightly mix with mortar and pestle until homogeneous.
3. Load mixture into mold cavity, hot press on heated platen press at 350° F. and 10,000 p.s.i. for 30 minutes. The molding process is typically done to a stop rather than at constant pressure using the amount of mixture to completely fill the cavity based on the above density calculation.
4. Cool mold and strip rim and hub from mold cavity. Postcure phenolic at 375° F. Raise temperature at the rate of 25° per hour. Hold 375° F. for 12 hours. Cool at the rate of 25° per hour. Total time: 36 hours.

As those skilled in the art are aware, formulations and treatments may be varied widely to meet specific service requirements. For example, when a polyimide resin is substituted for the phenolic resin, the mold pressure is reduced to about 5,000 pounds per square inch, the molding temperature is about 500° F., the time in the mold is 10–15 minutes, and the postmold treatment is about 2½ hours at about 475° F. Accordingly, the procedures outlined above are given for purposes of illustration only and should not be considered as limiting the invention.

Resin-bonded nickel-coated cubic boron nitride wheels have performed wet and dry grinding of Type A2 steel, which is commonly used for dies, high speed cutting tool steels, etc.; Type T-15 steel which has a high tungsten content; and Type M-2 steel which has molybdenum as the principal alloying ingredient. Table I below gives performance figures for an M-2 steel comparing nickel-coated cubic boron nitride wheels with uncoated cubic boron nitride wheels. The term "grinding ratio" is the unit volume of work material removed per unit volume of wheel wear.

TABLE I.—WET SURFACE GRINDING

| Cubic boron nitride Wheel No. | Mesh size | Coating level (weight percent nickel) | Down-feed per pass | Grinding ratio | Percent performance improvement over similar uncoated wheel |
|---|---|---|---|---|---|
| ASD-177 | 80/100 | 0 | .001 | 273 | |
| ASD-175 | 80/100 | 59.6 | .001 | 891 | 226 |
| ASD-177 | 80/100 | 0 | .002 | 29 | |
| ASD-175 | 80/100 | 59.6 | .002 | 367 | 1,165 |
| B1A1-5-170 | 140/170 | 0 | 0.01 | 109 | |
| ASD-182 | 140/170 | 64.6 | .001 | 655 | 502 |
| B1A1-5-170 | 140/170 | 0 | .002 | 15 | |
| ASD-182 | 140/170 | 64.6 | .002 | 139 | 828 |

It will be noted from Table I that the minimum improvement brought about by applying a coating of nickel to the cubic boron nitride particles was 226 percent. Even more spectacular is the relative performance improvement gained with nickel-coated cubic boron nitride where the material removal rate is doubled by increasing the downfeed from 0.001 to 0.002 inch. At the increased material removed rate conditions the grinding ratio achieved with the coated versus uncoated abrasive is 365 and 29, respectively. In this case, the performance improvement is 1,165 percent. In fact, the grinding ratio achieved at 0.002 inch downfeed with the coated cubic boron nitride abrasive is considerably higher than that of the uncoated cubic boron nitride abrasive at 0.001 inch downfeed. Thus, the wheel wear of coated cubic boron nitride at double the material removal rate is less than the wheel wear of uncoated cubic boron nitride at half that material removal rate.

Table II below gives comparative test results on four additional samples of M-2 steel having a Rockwell C hardness of 60 and also four samples of A-2 steel having a Rockwell C hardness of 61:

TABLE II.—WET SURFACE GRINDING

| Cubic boron nitride wheel and mesh size | Material | Coating level (percent weight nickel) | Down feed per pass, inches | Grinding ratio | Percent of performance improvement |
|---|---|---|---|---|---|
| R5090, 100/120 | M-2 | 0 | .001 | 160 | |
| R5091, 100/120 | M-2 | 60 | .001 | 593 | 270 |
| R5090, 100/120 | M-2 | 0 | .002 | 16 | |
| R5091, 100/120 | M-2 | 60 | .002 | 340 | 2,010 |
| R5090, 100/120 | A-2 | 0 | .001 | 25 | |
| R5091, 100/120 | A-2 | 60 | .001 | 175 | 600 |
| R5090, 100/120 | A-2 | 0 | .002 | 12 | |
| R5091, 100/120 | A-2 | 60 | .002 | *35 | 190 |

* Wheel R5091 was nearly consumed by the time this test was begun and only one test point could be run at .002" downfeed on A-2 material. Consequently, the grinding ratio attained is at best questionable and is included only to show that an improvement over uncoated cubic boron nitride was attained even with a wheel having an extremely thin layer of abrasive remaining.

Table II shows that the performance improvement obtainable on M-2 steel is maintained on A-2 steel.

Table III below gives comparative performance figures covering the dry grinding of samples of M-2 steel having a Rockwell C hardness of 64 and T-15 steel having a Rockwell C hardness of 65:

TABLE III.—DRY GRINDING

| Cubic boron nitride wheel and mesh size | Coating level (percent nickel by weight) | Material | Infeed/ double-pass, inches | Grinding ratio | Percent performance improvement over similar uncoated wheel |
|---|---|---|---|---|---|
| FC911, 60/80 | 0 | M-2 | .001 | 126 | |
| FC928, 60/80 | 60 | M-2 | .001 | 1,849 | 1,370 |
| FC911, 60/80 | 0 | M-2 | .002 | 19 | |
| FC928, 60/80 | 60 | M-2 | .002 | 310 | 1,530 |
| FC11, 60/80 | 0 | T-15 | .001 | 51 | |
| FC928, 60/80 | 60 | T-15 | .001 | 145 | 165 |
| FC911, 60/80 | 0 | T-15 | .002 | 60 | |
| FC928, 60/80 | 60 | T-15 | .002 | 62 | 3 |

The results for M-2 steel shown in Table III further substantiate the exceptional increase in performance attained by the use of nickel-coated cubic boron nitride. In the case of T-15 steel, the improvement was not so appreciable at an infeed of 0.001 inch and at an infeed of 0.002 inch the grinding ratio was substantially the same whether the nickel coating was or was not present. The T-15 results show that there are many factors which enter into performance figures and the element of predictability is not very high. In addition to such items as wheel diameter, wheel width, wheel speed, etc., the feed rate and physical properties of the workpiece play an important part in determining optimum grinding conditions.

It was previously pointed out that cubic boron nitride is quite inferior to diamond in cutting tungsten carbides. The reverse is true, although not uniformly so, in the case of hardened steels and steel alloys. Table IV below compares grinding ratios for aluminum oxide, nickel-coated cubic boron nitride and nickel-coated diamond on a number of hardened steels.

TABLE IV.—WET SURFACE GRINDING

| Material | Al₂O₃ grinding ratio | Nickel-coated cubic baron nitride grinding ratio | Nickel-coated diamond grinding ratio | Percent improvement cubic baron nitride over diamond |
|---|---|---|---|---|
| M-2 | 4.5 | 1,030 | 85 | 1,100 |
| M-4 | 2.0 | 180 | 95 | 90 |
| T-15 | .8 | 120 | 100 | 20 |
| O-1 | 50 | 750 | 135 | 455 |
| A-2 | 20 | 390 | 210 | 86 |
| W-1 | 40 | 420 | 270 | 55 |
| D-2 | 3.0 | 650 | 1,000 | −35 |

In Table IV, the M-4 material is a molybdenum alloy steel differing from the M-2 material in having a higher carbon content and a vanadium content of 4 percent instead of 2 percent. The O-1 material is an oil hardened cold work tool steel. The W-1 material is a water hardened tool steel. The D-2 material is a high carbon, high chromium type of cold work tool steel.

Table IV shows that nickel-coated cubic boron nitride is superior to nickel-coated diamond on all except the D-2 steel. In the case of M-2 and O-1 steels, the superiority of cubic boron nitride is dramatic and surprising. The reasons for the wide variation in performance are not clearly understood at the present time. However, as previously stated, the physical and chemical properties of the workpiece play a large role in wheel effectiveness.

Table IV also gives grinding ratios for aluminum oxide, the most commonly used commercial abrasive for hardened steels and steel alloys. The vast superiority of nickel-coated cubic boron nitride over aluminum oxide emphasizes the importance of this invention in enabling cubic boron nitride to be competitive with aluminum oxide in spite of the great cost and price differential between the two.

Table V below compares the dry grinding ability of nickel-coated cubic boron nitride vs. nickel-coated diamond vs. aluminum oxide on three alloy steels.

TABLE V.—DRY SURFACE GRINDING

| Material | Nickel-coated cubic boron nitride grinding ratio | Nickel-coated diamond grinding ratio | Al₂O₃ grinding ratio | Improvement Percent nitride over diamond and Al₂O₃ |
|---|---|---|---|---|
| M-2 | 1,200 | 10 | 10 | 11,900 |
| M-42 | 900 | 10 | 10 | 8,900 |
| T-15 | 500 | 10 | 10 | 4,900 |

The results listed in Table V are averaged and rounded off values from a number of tests made under comparable conditions of grinding. The M-42 material differed from the M-2 material in having 1.5 percent tungsten vs. 6.00 percent for M-2; 9.5 percent molybdenum vs. 5.00 percent for M-2; and 8.00 percent cobalt vs. 0.00 percent for M-2. While Table IV shows a striking improvement for nickel-coated cubic boron nitride over nickel-coated diamond for most steels subject to wet grinding, Table V shows even a more striking improvement in the case of dry grinding. In fact, nickel-coated diamond is no better than aluminum oxide for the dry grinding of tool steels and is greatly inferior to its performance in wet grinding. This is in sharp contrast to nickel-coated cubic boron nitride which is as good in dry grinding applications as it is in wet grinding.

The data of Tables I–V show a surprising degree of superiority of nickel-coated cubic boron nitride over uncoated borazon as well as a surprising degree of superiority of nickel-coated cubic boron nitride over nickel-coated diamond in the grinding of most tool steels and steel alloys. Of particular interest and commercial importance is the ability of nickel-coated cubic boron nitride to grind alloy steels under dry grinding conditions. Nevertheless, these data are also contradictory in certain respects for they show that a superiority in grinding one material does not necessarily carry over to another material or, if it does carry over, that the degree of superiority is changed considerably. Diamond and cubic boron nitride share in common only the properties of extreme hardness and the cubic crystal system. (Both diamond and cubic boron nitride can be superhard in a hexagonal form but this form of both materials is relatively rare). From the standpoint of elemental composition and chemistry there is no relationship between the carbon of diamond and the boron nitride of cubic boron nitride. As was heretofore mentioned, cubic boron nitride can withstand temperatures of 2,500° F. whereas diamond begins to burn at 1,600° F. Sacco contended that the improvement brought about in resinoid wheels by the use of metal-coated diamond was due to the improved bond between the resin and metal and the different thermal properties of metal-coated diamond versus uncoated diamond. The data of Tables I–V suggest that, at best, Sacco's explanation is oversimplified and that there may be other, more important factors presently unidentified which are responsible. This is further borne out by the fact that copper-coated cubic boron nitride did not produce a significantly better grinding wheel for dry grinding than uncoated cubic boron nitride. Copper-coated and cobalt-coated cubic boron nitride wheels were superior to uncoated wheels for wet grinding but were inferior to nickel-coated wheels.

It might be supposed that the combination of boron and nickel is responsible for the results shown in Tables I–V. In order to test this, three wheels were made with boron carbide abrasive. These wheels were identical except that in one the abrasive had no coating. In another, the abrasive had a coating of 49 percent by weight of nickel and in the other, 58.8 percent nickel. All three wheels were tested on M-2 steel. The uncoated wheel had a grinding ratio of 1.00; the wheel with 49 percent nickel had a grinding ratio of 1.01; and the wheel with 58.8 percent nickel had a grinding ratio of 0.73. Thus, the experimental results achieved so far do not provide a clear explanation of the principles underlying the invention.

What we claim as new and desire to secure by Letters Patent of the United States is:

1. In a grinding wheel for hardened steel and steel alloys, an abrasive surface consisting of nickel-coated cubic boron nitride particles, the nickel constituting from 30 to 80 weight percent of the coated particles, said coated particles being embedded in a matrix of resinous material selected from the group consisting of phenol-formaldehyde, urea-formaldehyde, melamine-formaldehyde, epoxy, polyester, polyamide and polyimide resins, and mixtures thereof.

2. A grinding wheel as claimed in claim 1 wherein the resinous material is phenol formaldehyde.

3. A grinding wheel as claimed in claim 1 wherein the resinous material is a polyimide.

4. A method of making an abrasive wheel for hardened steel and steel alloys comprising applying a coating of nickel to a quantity of cubic boron nitride particles, the nickel constituting about 30 to 80 weight percent of the coated particles, mixing said coated particles with resinous material, selected from the group consisting of phenol-formaldehyde, urea-formaldehyde, melamine-formaldehyde, epoxy, polyester, polyamide and polyimide resins, and mixtures thereof and forming the coated cubic boron nitride resinous material mixture as the abrasive surface of a grinding wheel.

5. A grinding wheel as claimed in claim 4 wherein the resinous material is phenol formaldehyde.

6. A grinding wheel as claimed in claim 4 wherein the resinous material is a polyimide.

* * * * *